United States Patent [19]

Robinson et al.

[11] 4,271,578

[45] Jun. 9, 1981

[54] METHOD AND APPARATUS FOR REMOVING A SLEWING RING FROM A PEDESTAL MOUNTED CRANE

[75] Inventors: Frank M. Robinson, Hedon; Norman F. Taylor, Burstwick, both of England

[73] Assignee: Priestman Brothers Limited, Hull, England

[21] Appl. No.: 83,328

[22] Filed: Oct. 10, 1979

[30] Foreign Application Priority Data

Nov. 6, 1978 [GB] United Kingdom .............. 43265/78

[51] Int. Cl.[3] ...................... B66D 23/84; B23P 19/04

[52] U.S. Cl. .................................. 29/426.3; 212/175

[58] Field of Search .................... 29/426.3, 426.5, 252; 212/175, 180

[56] References Cited

U.S. PATENT DOCUMENTS 4,184,600 1/1980 Goss et al. ......................... 212/175

FOREIGN PATENT DOCUMENTS 631420 11/1949 United Kingdom .................... 212/175

*Primary Examiner*—Milton S. Mehr

*Attorney, Agent, or Firm*—Schwartz, Jeffery, Schwaab, Mack, Blumenthal & Koch

[57] ABSTRACT

The invention relates to a method of removing a slewing ring (3) from a pedestal-mounted crane (2). A carriage (14) is positioned on a pair of elongate guide members (9) which lie substantially parallel, both to one another and to the plane of the slewing ring (3), and which extend alongside the pedestal (14). The crane (2) is raised relative to the pedestal (4) by means of jacks (7) and the carriage (14) is moved to a position beneath the crane (2). The slewing ring (3) is then positioned on the carriage and withdrawn on the carriage from beneath the crane.

10 Claims, 3 Drawing Figures

METHOD AND APPARATUS FOR REMOVING A SLEWING RING FROM A PEDESTAL MOUNTED CRANE

Figure 1:
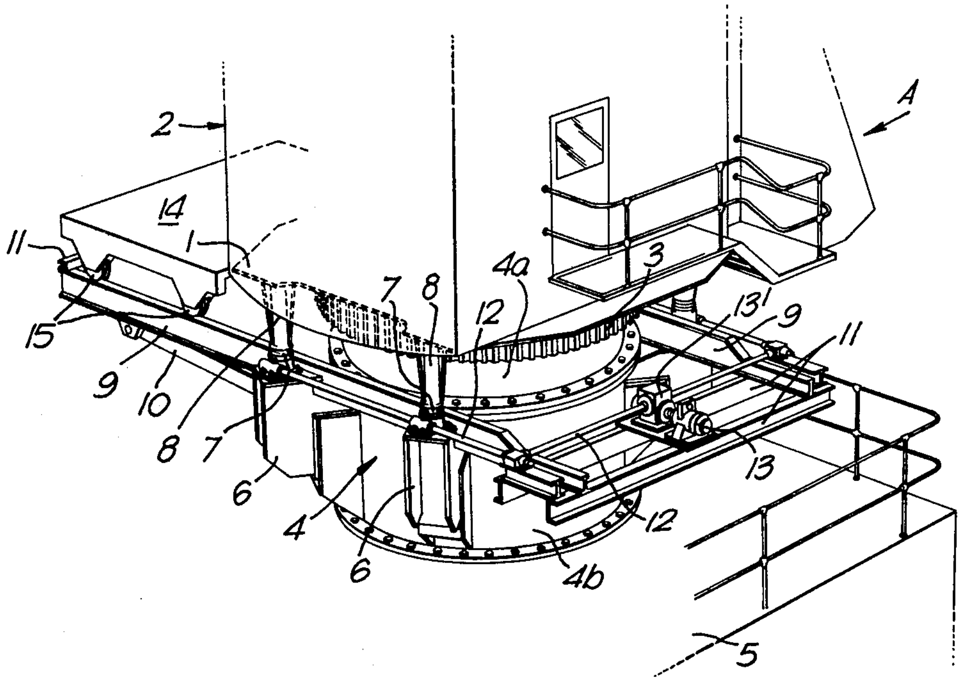

The present invention relates to the removal, for inspection or replacement, of a slewing ring from a pedestal-mounted crane. Typically, such cranes are used on off-shore sea platforms, for example oil rigs, and the slewing rings, which are positioned between the crane and the pedestal to enable rotation of the crane about a vertical axis, are required, often by law, to be removed periodically for inspection, and of course, sometimes need to be replaced.

In the past, removal has been an extremely expensive operation as the slewing rings have been removed by means of a floating crane which is used to lift the crane off the slewing ring, the slewing ring then being removed from the pedestal for inspection. It will be appreciated that the hiring of a floating crane is expensive and that, particularly in areas such as the North Sea, there is a measure of uncertainty involved in slewing ring removal due to the vagiaries of the weather. Additionally, the operation is a hazardous one involving, as it does, lifting of the pedestal-mounted crane from a floating crane which is varying in height relative to the platform due to wave action.

In order to overcome these problems and in accordance with the present invention a method of removing a slewing ring from a pedestal-mounted crane includes the steps of positioning a carriage on a pair of elongate guide members which lie substantially parallel, both to one another and to the plane of the slewing ring, and which extend alongside the pedestal; raising the crane relative to the pedestal by means of jacks; moving the carriage to a position beneath the crane; positioning the slewing ring on the carriage; and withdrawing the carriage together with the slewing ring from beneath the crane.

Preferably, the crane is lifted by a plurality of jacks spaced apart around the pedestal and being connected for extension together. The jacks may comprise screw-jacks and may be interconnected by a number of drive shafts and a gear box, with a motor, so that operation of the motor extends the jacks simultaneously.

It will be appreciated that such a method does away completely with the need for the hire of a floating crane and thus significant reductions in the cost of slewing ring removal can be achieved. (At the present day it can cost as much as 36,000 per day to hire a floating crane capable of lifting pedestal-mounted cranes).

Preferably, when the crane is raised the slewing ring remains attached to it and the carriage is moved to a position beneath the slewing ring so that the slewing ring can then be lowered gently onto the carriage prior to its withdrawal from underneath the crane. Alternatively, however, depending on the particular construction of the crane, it may be more suitable to raise the crane from the slewing ring and to position the carriage over the slewing ring and then lift the slewing ring onto the underside of the carriage, off the pedestal.

In some cases, depending on the particular construction of the crane superstructure and the pedestal, it will be useful to position spacing members between the jacks and either the underside of the crane or the pedestal.

Preferably, but this again depends on the structure of the crane and pedestal, the elongate guide members may be provided as part of a removable support structure which can be bolted to part of the pedestal, so that the guide members can be removed when the crane is in operation to avoid impeding the operation of the crane. Alternatively, the support structure may be combined with the structure on the pedestal during manufacture, the guide members either being formed integrally therewith or being insertable when the slewing ring requires to be removed.

The invention also includes apparatus for use in the method according to the invention, the apparatus comprising a carriage, a pair of elongate guide members mounted or for mounting on the pedestal, the guide members lying substantially parallel both to one another and to the plane of the slewing ring in use, and extending alongside the pedestal; and jacks for raising the crane relative to the pedestal.

The jacks may be formed integrally with either the support structure on the pedestal or with the crane superstructure, if desired.

Figure 2:
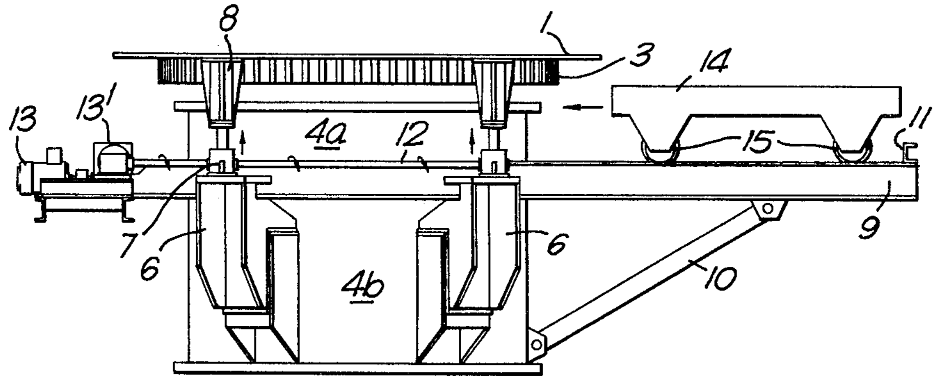
Figure 3:
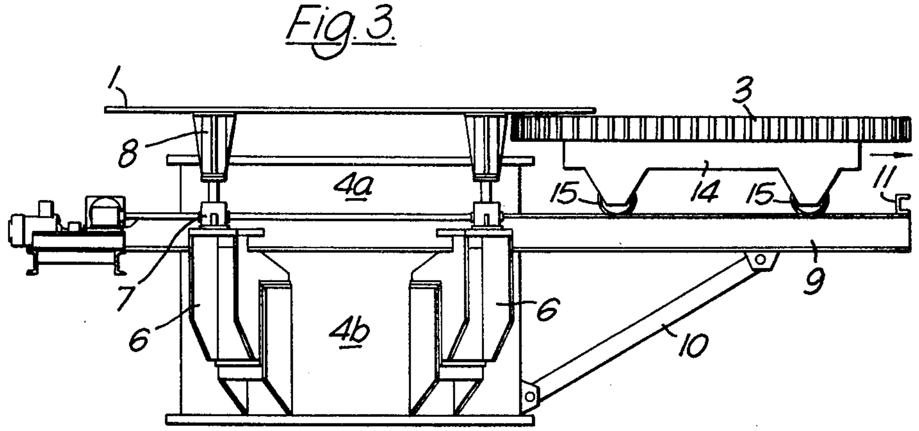

One example of a method and an apparatus according to the present invention will now be described with reference to the accompanying drawings in which:

FIG. 1 is a perspective view of a sea-platform, pedestal, slewing ring and lower end of a crane super-structure; and FIGS. 2 and 3 are partial side elevations on arrow A in FIG. 1 but showing different stages of the slewing ring removal operation.

In the present example the lower end 1 of the superstructure of a crane 2 is shown mounted for rotation by means of a cross-roll slewing ring 3 mounted on the top of a generally circular pedestal 4 which is formed in two sections 4*a* and 4*b* which are bolted together and fastened on to the deck 5 of the sea platform.

In order to enable removal of the slewing ring 3 the crane is first slewed into a suitable position and the boom (not shown) lowered into its rest to centralize the centre of gravity of the crane. Secondly, any of the slewing ring set screws (not shown), which attach the ring 3 to the crane 2 or pedestal 4 and which may be made inaccessible by the fitting of later components of the apparatus, are removed.

Four support brackets 6 are secured to the sides of the pedestal section 4*b*, the support brackets each mounting a screw-jack 7 which supports a spacing member 8 which is secured to the lower end 1 of the crane superstructure. A pair of guide rails formed by I-beams 9 are positioned on the brackets 6 closely adjacent the side of the pedestal 4 parallel to one another and parallel to the plane of the slewing ring 3. The I-beams 9 may each be integrally formed with a pair of the support brackets 6 if desired. To brace the beams 9 to the pedestal 4, each is tied to the base of the pedestal by means of a tie bar 10. Additionally, cross-bars 11 connect the free ends of the I-beams 9 to maintain the parallelism between them. Depending on the actual construction of the crane so it may be possible to do away with the spacing members 8 so that the tops of the jacks 7 would be bolted directed to the crane superstructure 2. The jacks 7 are interconnected for extension together by drive shafts 12 and driven by a single electrical motor 13 and gear box 13' mounted on two cross-bars 11 at one end of the beams 9. Of course, it would be quite feasible to replace the screw-jacks by interconnected hydraulic jacks should this be desired.

A carriage 14 which has, on each side a pair of flanged wheels 15 is then positioned on the I-beams 9. The carriage 14 has an inverted channel-shaped crosssection and this is done in order to enable the carriage to clear the top portion 4*a* of the pedestal and yet still be supported on the I-beams 9 at a position below the top of the pedestal 4. The remaining set-screws (not shown) which hold the slewing rings to the pedestal 4 are then removed and the jacks 7 actuated (FIG. 2) to raise the crane superstructure 2 off the pedestal 4. The remaining set-screws (not shown) hold the slewing ring 3 to the underside of the crane superstructure 2 so that this is raised with the crane. The carriage 14 is then rolled into positioned beneath the slewing ring 3 and the set screws holding it to the base of the crane 2 are removed and the slewing ring 3 lowered onto the carriage 14. Finally (FIG. 3) the carriage 14 is rolled out from underneath the crane to a position at which the slewing ring 3 can be inspected or easily removed for replacement.

The apparatus may be fitted to existing cranes or may be provided on new cranes as a standard fitting.

We claim:

1. A method of removing a slewing ring from a pedestal-mounted crane, the method comprising the steps of positioning a pair of elongate guide members along opposite sides of said slewing ring and substantially parallel to the plane of said slewing ring, positioning a carriage on said elongate guide members, positioning a plurality of jacks between said crane and said pedestal, extending said jacks to raise said crane relative to said pedestal, moving said carriage to a position beneath said crane, positioning said slewing ring on said carriage, and withdrawing said carriage together with said slewing ring thereon from beneath said crane along said guide members.

2. A method according to claim 1, wherein said slewing ring is raised together with said crane on extension of said jacks, and thereafter lowered onto said carriage for withdrawal from underneath said crane.

3. A method according to claim 1, wherein said crane is lifted off said slewing ring, thereafter said slewing ring being lifted to said carriage and supported therebeneath for withdrawal from underneath said crane.

4. Apparatus for use in removing a slewing ring from a pedestal-mounted crane, said apparatus comprising a pair of elongate guide members for attachment to said pedestal of said crane, a carriage movable along said elongate guide members, and a plurality of jacks for attachment between said pedestal and said crane for raising said crane relative to said pedestal in use.

5. Apparatus according to claim 4, wherein each of said elongate guide members has attached thereto a pair of support brackets, said support brackets being adapted for attachment to said pedestal.

6. Apparatus according to claim 5, wherein each of said support brackets mounts a respective one of said plurality of jacks.

7. Apparatus according to claim 5, wherein each of said elongate guide members is permanently attached to said support brackets.

8. Apparatus according to claim 4, wherein said jacks are interconnected for extension together.

9. Apparatus according to claim 8, wherein said jacks comprise screw-jacks, and further including a plurality of drive shafts interconnecting said jacks, a motor and a gear box interconnected with said drive shafts.

10. Apparatus according to claim 4, further including a plurality of spacing members each of which is adapted to be positioned between said jacks and said crane.

* * * * *